(12) United States Patent
Brohede et al.

(10) Patent No.: US 11,590,585 B2
(45) Date of Patent: Feb. 28, 2023

(54) DRILL DEVICE AND METHOD OF MANUFACTURING THE SAME

(71) Applicant: SANDVIK INTELLECTUAL PROPERTY AB, Sandviken (SE)

(72) Inventors: Ulrika Brohede, Knivsta (SE); Maria Teike, Solna (SE)

(73) Assignee: SANDVIK INTELLECTUAL PROPERTY AB, Sandviken (SE)

( * ) Notice: Subject to any disclaimer, the term of this patent is extended or adjusted under 35 U.S.C. 154(b) by 425 days.

(21) Appl. No.: 16/461,678

(22) PCT Filed: Nov. 17, 2017

(86) PCT No.: PCT/EP2017/079660
§ 371 (c)(1),
(2) Date: May 16, 2019

(87) PCT Pub. No.: WO2018/091683
PCT Pub. Date: May 24, 2018

(65) Prior Publication Data
US 2019/0351490 A1    Nov. 21, 2019

(30) Foreign Application Priority Data
Nov. 17, 2016 (EP) ..................................... 16199337

(51) Int. Cl.
*B23B 51/02* (2006.01)
*B23K 26/00* (2014.01)
*B23K 26/359* (2014.01)
*B23K 26/364* (2014.01)

(52) U.S. Cl.
CPC .......... *B23B 51/02* (2013.01); *B23K 26/0006* (2013.01); *B23B 2251/44* (2013.01); *B23B 2260/072* (2013.01); *B23B 2260/092* (2013.01); *B23K 26/359* (2015.10); *B23K 26/364* (2015.10)

(58) Field of Classification Search
CPC .......... B23B 2251/44; B23B 2260/072; B23B 51/02; B23B 2251/443
See application file for complete search history.

(56) References Cited

U.S. PATENT DOCUMENTS 9,144,845 B1    9/2015  Grzina et al.
9,216,460 B2 *  12/2015 Matsuda ................. B23B 51/06
2013/0302102 A1 11/2013 Green et al.

FOREIGN PATENT DOCUMENTS

| CN | 1143551 A | 2/1997 | |
| JP | S6067003 A | 4/1985 | |
| JP | 05044012 A | * 2/1993 | |
| JP | 2005319544 A | 11/2005 | |
| WO | WO-2004050314 A2 | * 6/2004 | ............. B23B 51/06 |

* cited by examiner

*Primary Examiner* — Alan Snyder
(74) *Attorney, Agent, or Firm* — Corinne R. Gorski

(57) ABSTRACT

A drill device includes a drill tip and a drill body having a rear portion. The drill tip includes at least a first clearance surface and the drill body includes at least a first land having a margin. An edge is disposed between the first clearance surface and the margin. A textured area having a plurality of recesses extends along at least a portion of the margin, in the direction of the rear portion of the drill body, from a position of 200 μm from the edge, from a position on the least first clearance surface, or from a position therebetween.

13 Claims, 5 Drawing Sheets

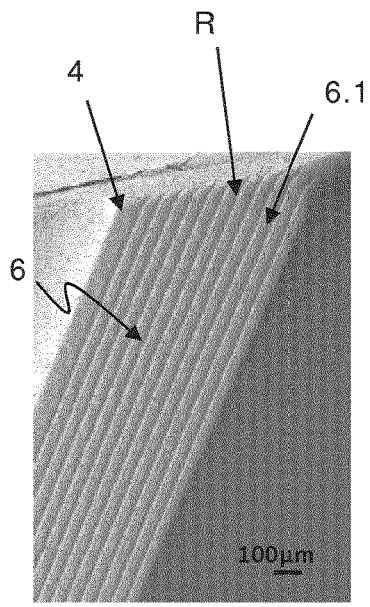
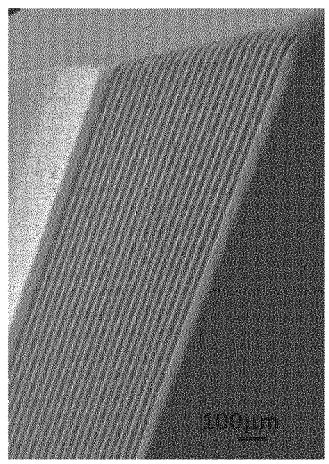
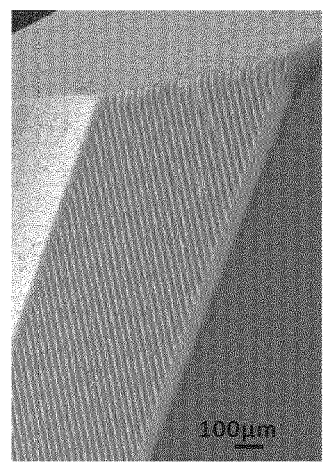
Fig. 10a Fig. 10b Fig. 10c
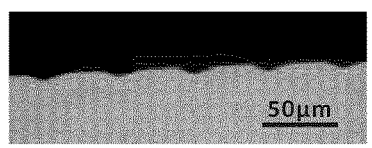
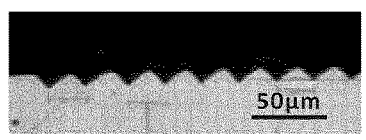
Fig. 11a Fig. 11b Fig. 11c

DRILL DEVICE AND METHOD OF MANUFACTURING THE SAME

RELATED APPLICATION DATA

This application is a § 371 National Stage Application of PCT International Application No. PCT/EP2017/079660 filed Nov. 17, 2017 claiming priority to EP 16199337.3 filed Nov. 17, 2016.

TECHNICAL FIELD

The present disclosure relates to a drill device having a margin with a textured area. The present disclosure also relates to a method for manufacturing a drill device having a margin with a textured area.

BACKGROUND ART

In drill devices, such as drills made in one piece, or drill tip inserts, for machining of metallic work pieces, it has been observed that the margin of the drill device is subjected to substantial amount of wear during the drilling operation. To increase the wear resistance, attempts have been made to provide the margin of the drill devices with textured areas. For example, in U.S. Pat. No. 9,144,845 B1 an area of the margin which is distal from the drill tip is provided with a texturing of discrete micro-recesses. However, while the test results of U.S. Pat. No. 9,144,845B1 appear promising there is still a need for improving the wear resistance of drill devices for machining metallic materials.

Thus, it is an object of the present disclosure to provide a drill device which solves or at least mitigate on problem of the prior-art. In particular, it is an object of the present disclosure to provide a wear resistant drill device. Yet a further object of the present disclosure is to provide a drill device having a margin with a textured area having an effective wear resistant pattern. A further object of the present disclosure is to provide a method for manufacturing a wear resistant drill device.

SUMMARY OF THE INVENTION

According to the present disclosure, at least one of these objects is achieved by a drill device 1 having a drill tip 2 and a drill body 3 having a rear portion 3.1, wherein;
  the drill tip 2 comprises at least a first clearance surface 2.1 and;
  the drill body 3 comprises at least a first land 3.2 having a margin 3.3 and;
  an edge 4 between the first clearance surface 2.1 and the margin 3.3; and;
  a textured area 6 comprising a plurality of recesses 6.1, the textured area 6 extends along at least a portion of the margin 3.3, in direction of the rear portion 3.1 of the drill body 3, from a position of 200 μm from the edge 4; or from a position in the least first clearance surface 2.1; or from a position there between,
    the recesses 6.1 extend in a direction Y, the direction Y being 20° from or within 20° from the direction of a longitudinal axis of rotation X of the drill 1.

Results from practical machining trials with the drill device according to the present disclosure have surprisingly shown that the area of the margin proximate to the tip of the drill is vulnerable to wear in machining operations. It has further surprisingly shown that a textured area extending from the tip of the margin or close thereto in direction of the rear of the drill device has a significant beneficial effect on the wear resistance of the margin and thereby the tool life of the drill device. Additionally, the orientation of the recesses of the textured area has shown to be of importance for the tool life of the drill such that the recesses are preferably to be oriented along or almost along the longitudinal axis of rotation X of the drill 1.

Further embodiments and alternatives of the drill device according to the present disclosure are disclosed in the appended claims and the detailed description.

BRIEF DESCRIPTION OF THE DRAWINGS

FIGS. 10a-10c: SEM-pictures of drill devices according to the present disclosure.

FIGS. 11a-11c: SEM-pictures of recesses in drill devices according to the present disclosure.

DETAILED DESCRIPTION OF EMBODIMENTS

The drill device according to the present disclosure will now be described more fully hereinafter. The drill device according to the present disclosure may however be embodied in many different forms and should not be construed as limited to the embodiments set forth herein. Rather, these embodiments are provided by way of example so that this disclosure will be thorough and complete, and will fully convey the scope of the present disclosure to those persons skilled in the art. Same reference numbers refer to same elements throughout the description.

Figure 1:
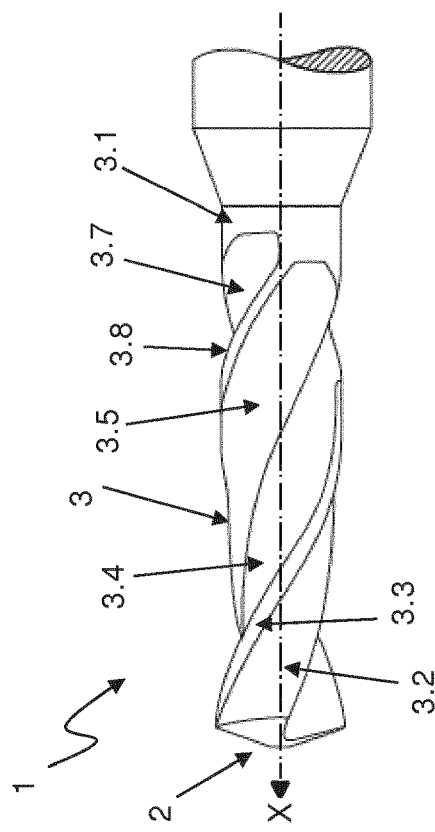

FIG. 1 shows schematically a drill device 1 according to a first embodiment of the present disclosure. In this case the drill device is a drill which is manufactured in one single piece of cemented carbice. The drill device 1 comprises a drill tip 2 and a drill body 3, which extends from the drill tip 2 and that has a rear portion 3.1. A drill shank for attaching the drill to a holding device (not shown) extends from the rear portion 3.1 of the drill body 3. The drill body 3 comprises a first land 3.2 and a second land 3.5 and a first flute 3.4 and a second flute 3.7 extending between the first and the second land 3.2, 3.5. The first and second lands 3.2, 3.5 and the first and the second flutes 3.4, 3.7 extend helically along the drill body 3 in direction from the rear portion 3.1 towards the drill tip 2. The first land 3.2 has a first margin 3.3 and the second land 3.5 has a second margin.

Figure 2:
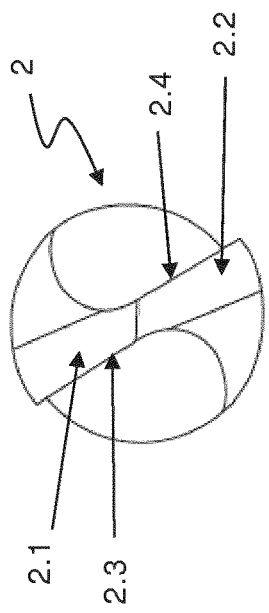
FIGS. 1-4: Schematic drawings of a drill device according to a first embodiment of the present disclosure.

FIG. 2 shows a front view of the drill tip 2 of the drill device 1 shown in FIG. 1. The drill tip 2 has a first cutting lip 2.3 and a second cutting lip 2.4. A first clearance surface 2.1 extends from the first cutting lip 2.3 and a second clearance surface 2.2 extends from the second cutting lip 2.4.

Figure 3:
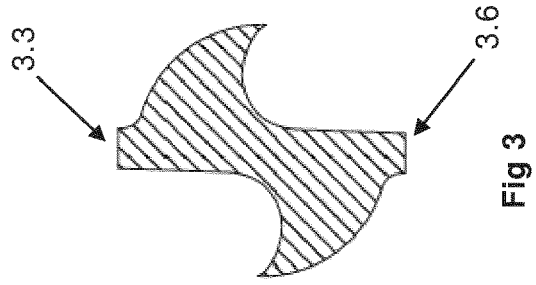

FIG. 3 is a cross-section of the drill device 1 in FIG. 1 showing the first and the second margin 3.3, 3.6. The margins 3.3, 3.6 are cylindrical portions of the drill body 3 that extends beyond the lands 3.2, 3.5. The margins 3.3, 3.6 support the drill device in the bore hole during drilling.

Figure 4:
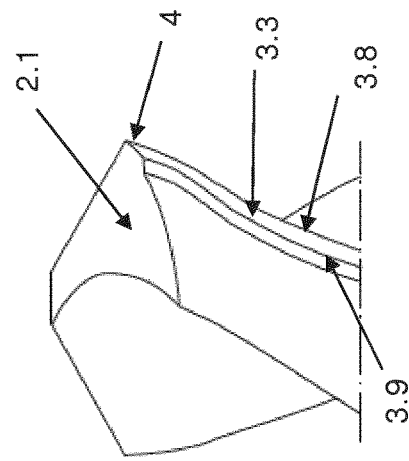

FIG. 4 shows a perspective view of the drill tip 2. Thus, the margin 3.3 has a leading edge 3.8 and a trailing edge 3.9. An edge 4 separates the upper end of the margin 3.3 from the first clearance surface 2.1. It is appreciated that the second margin 3.6 is not visible in FIG. 4 but that the second margin 3.6 comprises identical leading and trailing edges 3.8, 3.9 and an identical edge 4.

It is further appreciated that the drill device according to the present disclosure may comprise further lands, such as a third and a fourth land. It is further appreciated that each additional land may comprise a margin as described above.

The drill device 1 described above may be a twisted, or helical, drill provided with chip flutes 3.4, 3.7 extending helically around the drill. The drill device 1 may alternatively be provided with straight chip flutes extending in the longitudinal direction X of the drill. The drill device 1 may be provided with a drill tip 2.

The drill device may be manufactured from steel or hard metal such as cemented carbide, for example WC/Co. The drill may be manufactured by conventional methods including pressing or extrusion of a mixture of metal, carbide powder and binder followed by sintering. The drill may further comprise a wear resistant coating such as TiN, TiAlN and/or TiAl/TiAlCr applied with PVD, for instance. The coating can be a multi layered coating or a single layer. The coating can alternatively or in addition comprise a CVD coating for example comprising layers of TiN, TiCN, TiAlN and/or $Al_2O_3$. The thickness of said coating is preferably 1-5 µm.

Figure 5:
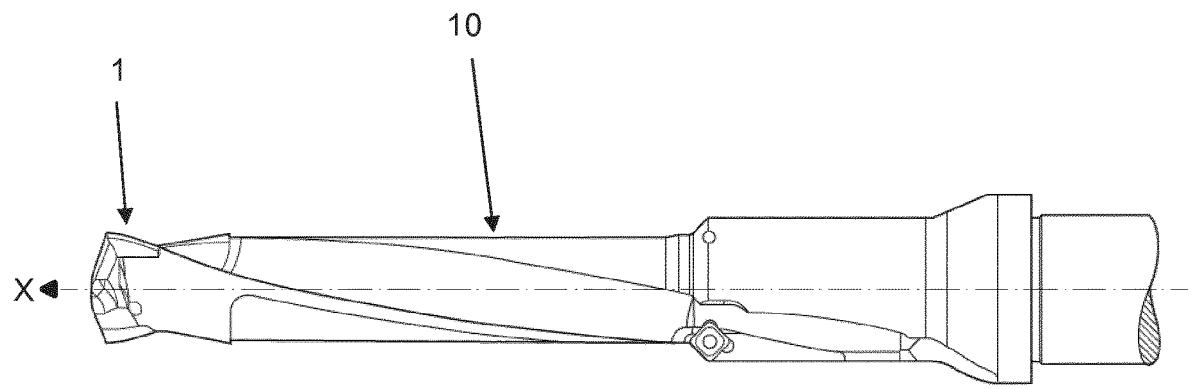
FIG. 5, 6: Schematic drawings of a drill device according to a second embodiment of the present disclosure.
Figure 6:
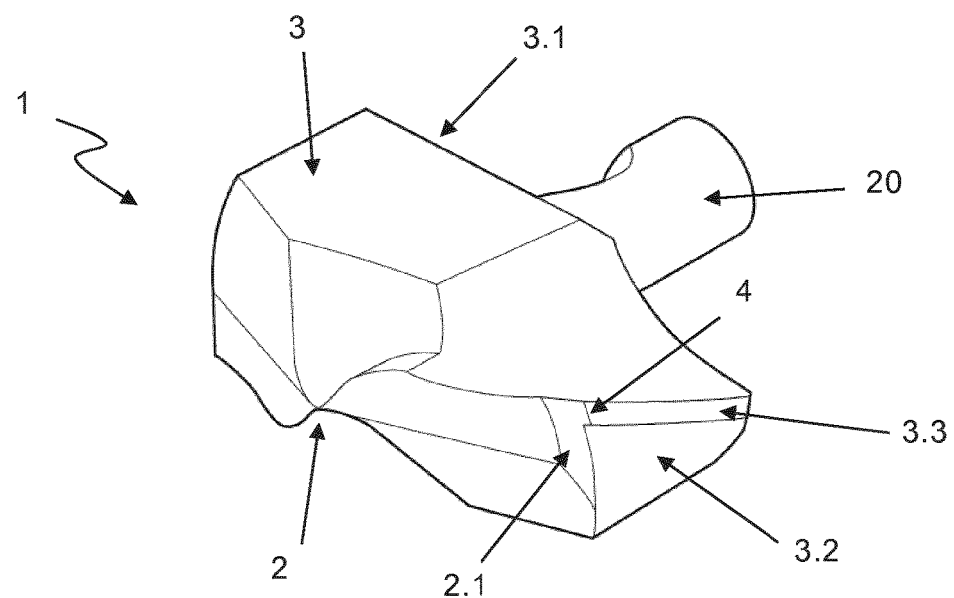

FIG. 5 shows a drill device 1 according to a second embodiment of the present disclosure. In this case the drill device 1 is an exchangeable drill tip insert which may be releasable attached to a drill tip holder 10. The drill device 1 of the second embodiment is shown in detail in FIG. 6 and comprises the same features as the drill device of the first embodiment. Thus, a drill tip 2, a body 3 having a rear portion 3.1, at least a first clearance surface, at least a first land 3.2 having at least a first margin 3.3 and an edge 4 between the clearance surface 2.1 and the margin 3.3. The clearance surface may comprise a corner chamfer. The drill device 1 according the second embodiment further comprises an attachment pin 20 extending from the rear portion 3.1 of the body 3 and adapted for attaching the drill device 1 to the drill device holder 10.

According to the present disclosure, the drill device is provided with a textured area which comprises recesses formed in the surface of the drill device. The textured area thereby extends along the margin, in direction of the rear portion of the drill body from a position of 200 µm from the edge between the margin and the clearance surface or from the clearance surface or from a position between the clearance surface and 200 µm from the edge. The following description applies to both the first and the second embodiments of the drill device according to the present disclosure.

Figure 7A:
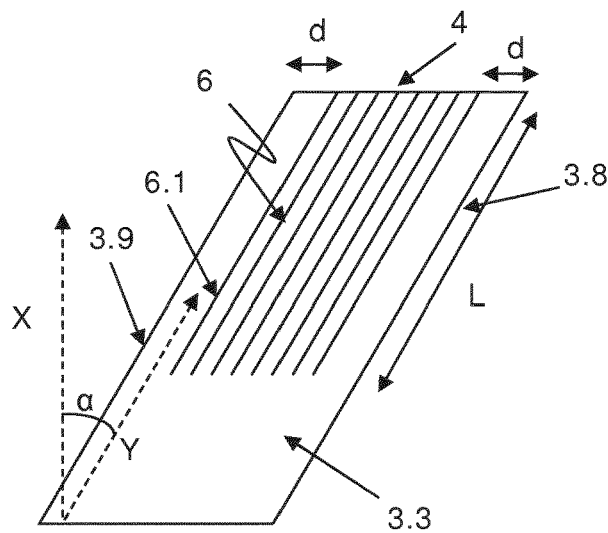
FIG. 7a: A schematic drawing of a textured area according to a first alternative of the present disclosure.

FIG. 7a shows a schematic view of the upper portion of the first margin 3.3 of a first alternative of the drill device 1. Also shown is the edge 4 between the margin 3.3 and the clearance surface (not shown). The rotational axis of the drill device 1 is indicated by arrow X. A textured area 6 comprising a plurality of recesses 6.1 in the form of elongate, continuous grooves that extends along the margin 3.3 from the edge 4 in direction of the rear portion of the drill body (not shown). The direction of extension of the recesses 6.1 is indicated by arrow Y. The angle between the direction X and the direction Y is α. The textured area 6 has a predetermined length which is determined parallel with the leading edge 3.8 of the margin 3.3. In the described embodiment, the length L of the textured area 6 corresponds to the length of the grooves 6.1. The textured area 6 has further a predetermined width W which is determined parallel to the edge 4 between the margin 3.3 and the clearance surface (not shown). In the described embodiment, the grooves 6.1 are arranged parallel with the leading edge 3.8 of the margin 3.3 and parallel with each other. The grooves 6.1 are further arranged equidistant from each other and are thus distributed homogenously over the width W of the textured area 6.

The predetermined length L and the predetermined width W of textured area 6 may be selected in view the overall design of the drill 1, the drilling application and the material of the work piece. Preferably, the predetermined length L is selected such that the textured area extends over the portion of the margin that is in contact with the surface of the bore in a drilling operation. Practical trials have shown that good wear resistance is achieved when the predetermined length L is 10-100% or 10-50% or 10-30% or 10-20% of the diameter of the drill device.

The predetermined width W of the textured area 6 may be selected such that the textured area 6 is positioned at a distance d from the leading edge 3.8 and/or the trailing edge 3.9 of the margin. The distance d may be selected in dependency of the dimensions of the drill device and the material of the work piece. For example, the predetermined distance d is 1-25 µm or 1-10 µm or 1-5 µm. Alternatively, the predetermined width W of the textured area 6 may be selected such that the textured area 6 extends from the leading edge 3.8 and/or the trailing edge 3.9 of the margin.

The orientation of the recesses 6.1 may extend in a direction Y, the direction Y being 20° from or within 20° from the direction of a longitudinal axis of rotation X of the drill 1, i.e. an angle α between X and Y is less than or equal to 20°. Alternatively the recesses 6.1 may extend in a direction Y, such that α is less than or equal to 10° or less than or equal to 5°. The direction Y may be within 10° or within 5° from the direction of a longitudinal axis of rotation X of the drill 1. The recesses 6.1 may extend parallel with a longitudinal axis of rotation X of the drill 1, i.e. α is zero. The leading edge of a drill may be helically positioned around the outer perifery of the drill at an angle β (the so called helix angle β) relative the longitudinal axis of rotation X of the drill. Recesses aligned with the leading edge is therefore within the scope of the present invention if β is less than or equal to 20°. The technical effect of recesses aligned in accordance with the orientation of the invention is thus that the wear of the margin of the drill is reduced. The wear is caused during sliding between the inner wall of the drilled hole and the surface of the margin during rotation of the drill in the hole and during drilling. The improved tool life can be due to improved lubrication at the sliding interface. An orientation of the recesses in parallel with a longitudinal axis of rotation X of the drill corresponds to the recesses on the margin being oriented perpendicular to the sliding direction of the wall of the drilled hole.

In one embodiment of the present invention the recesses extend in a direction Y, wherein the angle α, i.e. the angle between Y and the longitudinal axis of rotation X of the drill, is any angle between the direction of the leading edge of the drill, preferably the direction of the leading edge at the drill tip 2 of the drill 1, and the direction X.

In one embodiment of the present invention wherein the drill is twisted or helical with a helix angle β, the direction Y of extension of the recesses differs from the direction of the leading edge such that the angle α is less than the angle β.

Figure 7B:
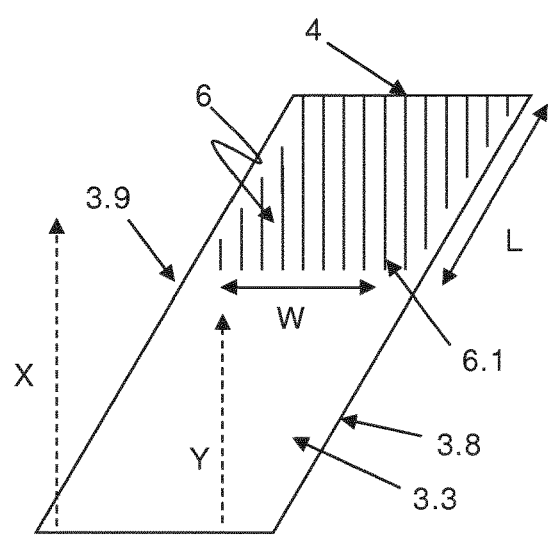
FIG. 7b: A schematic drawing of a textured area according to a second alternative of the present disclosure.

FIG. 7b shows a schematic view of the upper portion of the first margin 3.3 according to a second alternative of the drill device 1. Also shown is the edge 4 between the margin 3.3 and the clearance surface (not shown). The rotational axis of the drill device 1 is indicated by arrow X. A textured area 6 comprising a plurality of recesses 6.1 in the form of elongate, continuous grooves extends along the margin 3.3 from the edge 4 in direction of the rear portion of the body (not shown). The direction of extension of the recesses 6.1 is indicated by arrow Y. Also in this alternative, the textured area 6 has predetermined length L, determined parallel to the leading edge 3.8 of the margin 3.3 and a predetermined W, determined parallel to the edge 4 between the margin 3.3 and the clearance surface (not shown). Identical with the first alternative, the textured area 6 is arranged at a predetermined distance d (not shown) from the leading edge 3.8 and/or the trailing edge 3.9 of the margin 3.3. However, the textured area 6 may extend from the trailing edge 3.9 to the leading edge 3.8 of the margin. The grooves 6.1 are in this embodiment oriented parallel with the axis of rotation X of the drill 1. Thus in the described embodiment, a portion of the grooves 6.1 may extend, parallel with axis of rotation X, from the edge 4 and a portion of the grooves 6.1 may extend parallel with axis of rotation X from the leading edge 3.8 and the trailing edge 3.9 of the margin or from a predetermined distance d from the leading edge 3.8 and/or the trailing edge 3.9. Practical trials have shown that this orientation of the grooves provides a high increase in wear resistance to the margin.

According to an alternative (not shown), the textured area extends along the margin from a position of 200 µm from the edge 4. That is, the textured area initiates at a position which lies between the edge 4 and the rear portion of the drill device. According to an alternative, the textured area initiates at position between the edge 4 and 200 µm from the edge 4. For example the textured area initiates at a position of 0-100 µm from the edge and extends along the margin in direction towards the rear portion of the drill device.

Figure 8:
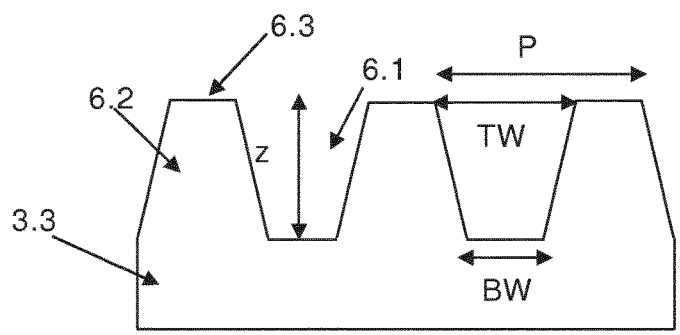
FIG. 8: A schematic drawing of recesses in the margin of a drill device according to the present disclosure.

FIG. 8 shows a schematic cross-sectional view of the grooves 6.1 seen perpendicular to the width W of FIG. 7a or FIG. 7b. Thus, the grooves 6.1 formed in the margin 3.3 are separated by ridges 6.2 of margin material. The grooves 6.1 have a depth Z and a top width TW and a bottom width BW. The grooves 6.1 are formed in margin such that the top width TW is greater than the bottom width BW. The ridges 6.2 have a top surface 6.3 which divides two adjacent grooves 6.1. In FIG. 8, the grooves 6.1 and the ridges 6.3 are depicted as mutually inverted truncated cones. However, in reality the shape of the grooves and the ridges is more complex and involves radiuses. The grooves 6.1 are formed in surface of the drill device such that grooves 6.1 and ridges 6.2 are repeated with a periodicity P. The periodicity P is determined from the end of the top surface 6.3 of one ridge 6.2 across the adjacent groove 6.1 to the corresponding end of the end surface 6.3 of the next ridge 6.2. The relationship between top width of the grooves and the periodicity should be TW≤P. The periodicity P, the top width TW of the grooves and the depth Z of the grooves 6.1 are significant for the wear resistance provided by the textured area 6. Preferably, the periodicity P is selected in the interval of P=10-300 µm, more preferred P=20-70 µm or 20-30 µm. Preferably, the top width TW is selected in the interval TW=10-300 µm, more preferred TW=20-50 µm. Preferably, the depth Z is selected in the interval Z=1-50 µm, more preferred Z=2-7 µm or 2-5 µm. According to one example P=50 µm, W=30 µm, Z=4 µm. According to one example P=25 µm, TW=25 µm, Z=6 µm. According to one example P=25 µm, TW=25 µm, Z=3 µm.

Figure 9A:
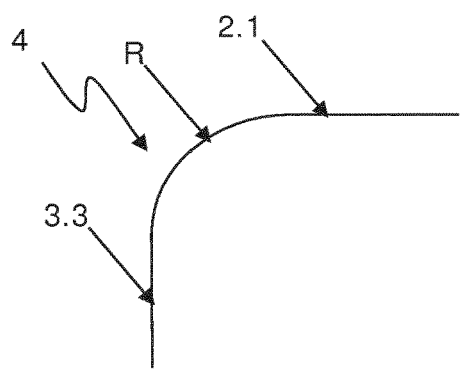
FIG. 9a, 9b: Schematic drawings of the margin of a drill device according to the present disclosure.
Figure 9B:
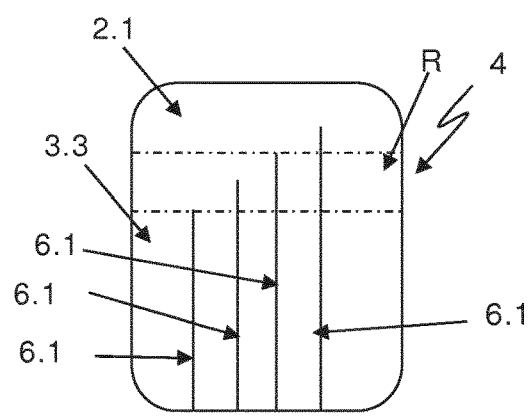

FIG. 9a shows a side view of the edge 4 between the margin 3.3 and the clearance surface 2.1 of the drill device 1. Seen in a microscopic perspective, the edge 4 have a radius R which joins the margin 3.3 and the clearance surface 2.1. FIG. 9b shows schematically a front view projection of FIG. 7a. The radius R is indicated as the area between the two dashed lines. Thus, the grooves 6.1 of the textured area 6 may extend from the boundary between the radius R and the margin 6.3 or from the radius R or from the boundary between the radius R and the clearance surface 2.1. Also indicated in FIG. 9b is a third alternative of the present disclosure in which the textured area extends from the clearance surface 2.1, over the edge 4 and along the margin 3.3 in direction of the rear portion of drill body. This is schematically indicated by the rightmost groove 6.1.

Preferably, the textured area extends along the margin to the edge 4. Practical trials have shown that this configuration provides a high increase in wear resistance to the margin.

The textured area may be applied by a laser beam. Preferably the laser beam is moved along the margin indirection of the edge 4. The advantage thereof is that when the laser beam reaches the curvature of the edge 4 it will loose focus with the surface of the margin and the forming of grooves will cease. This allows for an easy and effective way of forming textured area of grooves which extend along to the margin to the edge 4.

Although particular embodiments have been disclosed in detail this has been done for purpose of illustration only, and is not intended to be limiting. In particular it is contemplated that various substitutions, alterations and modifications may be made within the scope of the appended claims.

For example, the textured area has here above been described with reference to two alternatives of elongate grooves. However, it is appreciated that the recesses of the textured area may have different configuration and orientation. For example, the textured area may comprise a plurality of discrete recesses which are distributed with a predetermined periodicity both in direction along the margin and in direction across the margin. It is also possible to foresee other design of continuous grooves. For example grooves that extends in the form of sinus curve.

Moreover, although specific terms may be employed herein, they are used in a generic and descriptive sense only and not for purposes of limitation. Finally, reference signs in the claims are provided merely as a clarifying example and should not be construed as limiting the scope of the claims in any way.

EXAMPLES

Hereinafter, the drill device according to the present disclosure will be described with reference to examples.
Preparation
A plurality of 870-1400-14-MM (grade GC2234) exchangeable drill tip inserts with a helix angle of 25° were prepared with textured areas in accordance with the below description.

Drill tip insert substrates with a composition of 84.74 wt % WC, 1.56 wt % $Cr_3C_2$, 0.02 wt % TiC and the rest Co were provided. The drill tip insert substrates were coated with a 2 μm thick TiAlN coating applied with PVD forming drill tip inserts. GC2234 exchangeable drill tip inserts are commercially available from the company Sandvik Coromant AB. The margins of the drill tip inserts were provided with textured areas prior to applying the coating to the drill tip inserts. The drill tip inserts were divided into three groups. Each group was divided into two sets which subsequently were subjected to two separate machining trials (DP1 and DP2). A first comparative group of un-textured drill tip inserts was also prepared. Prior to testing the drill tip inserts were mounted on a drill tip holder made of tool steel.

A first group (15UB08) of drill tip inserts was provided with a textured area comprising elongate grooves extending parallel with the leading edge of the margin.

A second group (15UB06) of drill tip inserts was also provided with a textured area comprising elongate grooves extending parallel with the leading edge of the margin. The grooves of 15UB06 were of the same width depth and positioning as the grooves of 15UB08. However, the distance between the grooves (i.e. the periodicity) was half of 15UB08.

A third group (15UB07) of drill tip inserts was provided with a textured area comprising elongate grooves extending parallel with the axis of rotation of the drill device.

The laser used to produce the texturing on the drill tip inserts was a ps laser system from LMI (Preco) with a Talisker Ultra laser (diod pumped YAG) manufactured by Coherent. The target values for the laser grooves and laser settings for the three groups are presented below.

Target values for the laser grooves are shown in table 1 below.

Laser settings for each group are shown in table 2 below.

TABLE 2

| Laser settings | |
|---|---|
| Wave length λ | 355 nm |
| Effect, P | 2 Watt (50% of max.) |
| Frequency, f | 200 kHz |
| Velocity, v | 400 mm/s |
| Spot distance, δx = v/f | 2 μm |
| Focal height, Z | −200 μm |
| No. passings, N | 20 |

The position of the textured area was chosen to cover the area where wear occurs and the grooves were stretched across the edge where the margin surface meets the clearance surface. The intention was to texture the surface as close to the periphery of the edge and towards the rear of the margin. The size of the textured area was determined by the curvature of the drill tip, as the margin has a helix formed surface the focal height will vary, setting a limit for the texturing distance along the margin. The length of the textured area was about 2 mm which is approximately 20% of the total margin length. The width of the textured area was difficult to measure using either LOM or SEM images, due to low magnification (LOM) and due to tilted position giving larger distance (SEM). Total margin width is 0.702 mm and the target of texturing the whole width 0.7 mm was not completely reached.

FIG. 10a shows a SEM analyses at large magnification of 15UB06. FIG. 10b shows 15UB07 and FIG. 10c shows 15UB08.

FIG. 11a-11c shows the profile of the grooves in the textured area of a drill tip of respective sample groups 15UB06, 15UB07 and 15UB08.

The numerical results of the laser trenches and textured area size of the respective sample groups is shown in table 3 below.

TABLE 3

| Results of the laser trenches and textured area size | | | |
|---|---|---|---|
| Parameters | 15UB06 | 15UB07 | 15UB08 |
| Groove width, TW | 26.5 ± 1.5 μm | 23.0 ± 1.3 μm | 25.3 ± 0.4 μm |
| Groove depth, Z | 3.4 ± 0.3 μm | 6.2 ± 1 μm | 2.8 ± 0.3 μm |
| Groove periodicity, P | 50 μm | 25 μm | 25 μm |
| Distance between edge and textured area | 0 μm | 0 μm | 0 μm |
| Texturing width, W | ~650 μm | ~650 μm | ~650 μm |
| Texturing length, L | ~1.8 mm | ~1.8 mm | ~2.0 mm |

TABLE 1

| Target values for the laser grooves | | | |
|---|---|---|---|
| Parameters | 15UB08 | 15UB06 | 15UB07 |
| Groove width, TW | 25 μm | 25 μm | 25 μm |
| Groove depth, Z | 4 μm | 4 μm | 4 μm |
| Groove periodicity, P | 50 μm | 25 μm | 25 μm |
| Distance between edge and textured area | 0 μm | 0 μm | 0 μm |
| Texturing width, W | 0.7 mm | 0.7 mm | 0.7 mm |
| Texturing length, L | 2 mm | 2 mm | 2 mm |

Testing

The drill tips were tested in unalloyed steel S235JR+N (Livallco Stål AB) in through hole drilling. LOM images were taken and the wear was measured during the test every 50:th-100:th hole. Three different stopping criteria were set:
1) Flank wear (FW)>0.25 mm
2) Chippings (CH)>0.25 mm
3) Margin wear which covers the full upper edge towards the primary clearance The cutting parameters for testing are shown in table 4.

TABLE 4

| Cutting parameters for testing | |
|---|---|
| Machine | Matsuura 2 |
| Drill diameter [mm] | 14 |

TABLE 4-continued

| Cutting parameters for testing | |
| --- | --- |
| Work piece material | S235JR + N/SS1312/P1.1.Z.HT/CMC01.1 Charge: 13311755D, C-content: 0.16% |
| Vc [m/min] | 120 |
| Fn [mm/rev] | 0.2 |
| ap [mm] | 41 (3xD) |
| Coolant | Internal, 8% emulsion |

The two sets of drill tip inserts were subjected to separate machining trials (DP1 and DP2). For comparison, an un-textured drill tip inserts were also included in each machining trial.

The textured variants 15UB07 and 15UB08 were significantly less worn compared to the un-textured reference. 15UB06 had troubles with function, with bad noise and chipping in DP1 and breakage in DP2. Neither did it show the same improvement in wear resistance as 15UB07 and 15UB08. All textured variants show a weakness on the corner and upper edge, close to the flank face, which is worn faster than the rest of the margin. Also, in the area closest to the leading edge of the margin on 15UB07 and 15UB08, the substrate is visible. This is probably due to the fact that the laser tracks did not cover this area.

The tool life was recorded for all tested variants. In Table 5 the tool life of tested variants is presented. The following abbreviations are used in Table 5:
Mw=Margin wear covering the whole upper edge towards flank face;
CH(C)=Chipping on corner;
CH(SE)=Chipping on leading edge of margin;
FW=flank wear.

TABLE 5

| Result of performance in tool life test | | | | |
| --- | --- | --- | --- | --- |
| Test of tool life (Nr. of holes) | Reference No texture | Reference 15UB06 | Reference 15UB07 | Invention 15UB08 |
| Test DP1 | 450 (MW) | 400 (CH(SE)) | 500 (FW, MW) | 550 (FW, MW) |
| Test DP2 | 350 (MW) | 266 (tool breakage) | 450 (CH(SE)) | 450 (CH(C)) |

Variant 15UB06 showed the worst performance, with functional problems including bad noise and vibrations, resulting in early chipping in DP1 and tool breakage in DP2. 15UB07 and 15UB08 both show an increase in tool life compared to the un-textured reference (REF LASER). The increase in tool life is not as good as the improvement in margin wear resistance, mainly for two reasons:
1) Flank wear starts to be significant for the tool life at around 550 holes in this test.
2) The corner and the secondary edge still show a fairly high wear rate compared to the rest of the margin.
Micrography The drill tips were also examined by Scanning Electron Microscopy SEM.

Figure 12A:
FIG. 12a-12c: SEM-pictures of a first set of drill devices according to the present disclosure after machining tests.
Figure 12B:
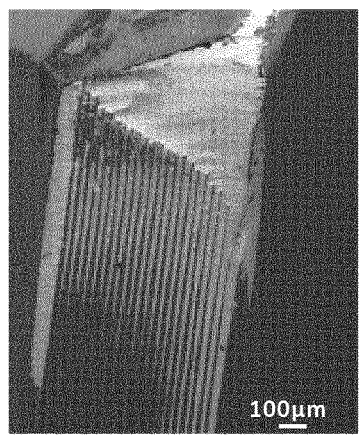
Figure 12C:
Figure 13A:
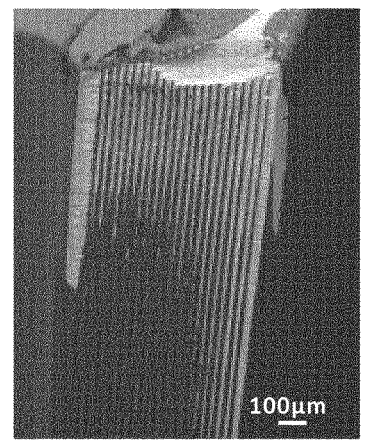
FIG. 13a, 13b: SEM-pictures of a second set of drill devices according to the present disclosure after machining tests.
Figure 13B:
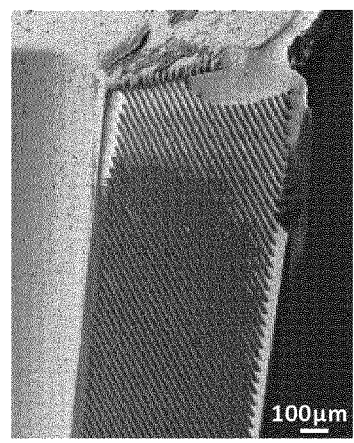
Figure 14A:
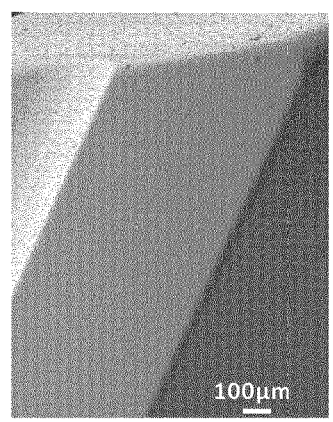
FIG. 14a-14c: SEM-pictures of a comparative drill device before and after machining tests
Figure 14B:
Figure 14C:

FIG. 12a-12c shows SEM-pictures of drill tips 15UB06, 15UB07, 15UB08 at the end of the tool life in DP1. In FIG. 12a (15UB06) tool life was 400 holes, in FIG. 12b (15UB07) tool life was 500 holes and in FIG. 12c (15UB07) tool life was 550 holes. FIGS. 13a and 13b shows SEM-pictures of drill tips 15UB07 and 15UB08 at the end of the tool life in DP2. In FIG. 13a (15UB07) tool life was 450 holes and in FIG. 13b (15UB08) tool life was 450 holes. As comparison, FIG. 14b shows SEM-pictures of a non-textured drill-tip (see FIG. 14a) in DP1 having a tool life of 450 holes and FIG. 14c shows a non-textured drill tip in DP2 having a tool life of 350 holes.

It is clear from the SEM-pictures that there is a big difference in margin wear between non-textured drill tips and textured drill tips, even though the textured drills have run longer. It is also clear that the orientation of the recesses has a great influence on the tool life. The orientation parallel with the longitudinal axis of rotation (X) of the drill (15UB08) showed the longest tool life.

The invention claimed is:

1. A drill device comprising:
    a drill tip having at least a first clearance surface;
    a drill body having a rear portion at least a first land having a margin;
    an edge disposed between the first clearance surface and the margin; and
    a textured area including a plurality of recesses in the form of elongate continuous grooves extending along at least a portion of the margin in direction of the rear portion of the drill body from a position of 200 μm from the edge, from a position on the at least first clearance surface, or from a position therebetween, wherein the plurality of recesses are arranged such that a ridge is formed between adjacent recesses, wherein the plurality of recesses have a predetermined periodicity (P), wherein the plurality of recesses extend in an extension direction over the portion of the margin that is in contact with the surface of a bore in a drilling operation, the extension direction being 20° from or within 20° from a longitudinal direction of a longitudinal axis of rotation of the drill device, wherein a depth of the grooves ranges from 1-50 μm and the periodicity (P) ranges from 20-30 μm, wherein the periodicity is determined from an end of a top surface of one ridge across an adjacent groove to a corresponding end of an end surface of a next ridge, each of the grooves having a top width (TW) and a bottom width (BW), the top width (TW) being greater than the bottom width (BW), and wherein (TW)≤(P).

2. The drill device according to claim 1, wherein the textured area extends from the edge.

3. The drill device according to claim 1, wherein the edge has a radius, wherein the textured area extends from at least a portion of the radius of the edge.

4. The drill device according to claim 1, wherein the plurality of recesses are arranged parallel.

5. The drill device according to claim 4, wherein the extension direction is within 10° from the longitudinal direction.

6. The drill device according to claim 4, wherein the plurality of recesses extend parallel with the longitudinal axis of rotation.

7. The drill device according to claim 1, wherein the plurality of recesses are distributed over the textured area.

8. The drill device according to claim 7, wherein the top width (TW) is ≥10 μm.

9. The drill device according to claim 1, wherein the textured area has a predetermined length that is parallel to a leading edge of the margin and a predetermined width that is parallel to the edge.

10. The drill device according to claim 1, further comprising at least a first and second land, wherein each first and second land includes a margin, and wherein each margin a includes the textured area having the plurality of recesses.

11. A method of manufacturing a drill device according to claim 1, the method comprising the steps of:

providing the drill device, the drill device having a drill tip and a drill body having a rear portion, wherein the drill tip includes at least a first clearance surface and the drill body includes at least a first land having a margin, wherein an edge is disposed between the first clearance surface and the margin;

forming a textured area with a plurality of recesses in the form of elongate continuous grooves, wherein the plurality of recesses extend in an extension direction, the extension direction being 20° from or within 20° from the longitudinal direction of a longitudinal axis of rotation of the drill, wherein the plurality of recesses are arranged such that a ridge is formed between adjacent recesses, wherein the plurality of recesses have a predetermined periodicity (P), the plurality of recesses being formed by a laser beam, wherein the laser beam is moved along at least a portion of the margin to or from a position of 200 μm from the edge, a position of the clearance surface, or a position there between, wherein a depth of the grooves ranges from 1-50 μm and a periodicity (P) ranges from 20-30 μm, wherein the periodicity is determined from an end of a top surface of one ridge across an adjacent groove to a corresponding end of an end surface of a next ridge, each of the grooves having a top width (TW) and a bottom width (BW), the top width (TW) being greater than the bottom width (BW), and wherein (TW)≤(P).

12. The method according to claim 11, wherein the laser beam is moved along at least a portion of the margin in a direction from the rear portion of the drill body towards the edge between the margin and the clearance surface.

13. A drill device comprising:
a drill tip having at least a first clearance surface;
a drill body having a rear portion and at least a first land having a margin;
an edge disposed between the first clearance surface and the margin; and
a textured area including a plurality of recesses in the form of elongate continuous grooves extending along at least a portion of the margin in a direction of the rear portion of the drill body from a position of 200 μm from the edge, from a position on the at least first clearance surface, or from a position therebetween, wherein the plurality of recesses are arranged such that a ridge is formed between adjacent recesses, wherein the plurality of recesses extend in an extension direction over the portion of the margin that is in contact with the surface of a bore in a drilling operation, the extension direction being 20° from or within 20° from a longitudinal direction of a longitudinal axis of rotation of the drill device, and wherein the recesses are distributed over the textured area with a predetermined periodicity, wherein the recesses have a predetermined top width and a predetermined depth, wherein the predetermined periodicity is selected in the interval of 20-30 μm, wherein the periodicity (P) is determined from an end of a top surface of one ridge across an adjacent groove to a corresponding end of an end surface of a next ridge; and
wherein the predetermined top width (TW) is selected in the interval of 10-300 μm; and
wherein the predetermined depth is selected in the interval of 2-5 μm; and
wherein each of the grooves have a bottom width (BW), the top width (TW) being greater than the bottom width (BW), and wherein (TW)≤(P).

* * * * *